United States Patent
Mitchell et al.

(10) Patent No.: US 12,214,886 B2
(45) Date of Patent: Feb. 4, 2025

(54) VENTILATION SYSTEMS AND METHODS FOR INTERNAL CABINS OF VEHICLES

(71) Applicant: THE BOEING COMPANY, Chicago, IL (US)

(72) Inventors: Bradley J. Mitchell, Snohomish, WA (US); Ty Larsen, Everett, WA (US); Bryce Avery Vandyke, Snohomish, WA (US); Raymond Roeder, Everett, WA (US); Trevor Milton Laib, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 556 days.

(21) Appl. No.: 17/363,071

(22) Filed: Jun. 30, 2021

(65) Prior Publication Data

US 2022/0063815 A1 Mar. 3, 2022

Related U.S. Application Data (60) Provisional application No. 63/071,466, filed on Aug. 28, 2020.

(51) Int. Cl.
*B64D 13/00* (2006.01)

(52) U.S. Cl.
CPC ........ *B64D 13/00* (2013.01); *B64D 2013/003* (2013.01)

(58) Field of Classification Search
CPC .............. B64D 13/00; B64D 2013/003; B64D 2013/0625; B64D 2013/0651; B64D 2013/0655; B64D 2013/0688; B64D 11/0626

USPC .......................................................... 454/76
See application file for complete search history.

(56) References Cited

U.S. PATENT DOCUMENTS

| | | | | |
|---|---|---|---|---|
| 5,160,517 | A * | 11/1992 | Hicks | F24F 8/10 5/423 |
| 5,695,396 | A * | 12/1997 | Markwart | B64D 13/00 454/71 |
| 2007/0158499 | A1 * | 7/2007 | Whittingham | A61L 9/20 244/118.5 |
| 2009/0311951 | A1 | 12/2009 | Walkinshaw | |
| 2010/0081369 | A1 | 4/2010 | Space | |
| 2017/0129581 | A1 * | 5/2017 | Perkins | B64C 1/066 |
| 2019/0077215 | A1 * | 3/2019 | Baek | B60H 1/246 |
| 2019/0160417 | A1 * | 5/2019 | Matsumoto | B01D 53/0462 |
| 2019/0344891 | A1 * | 11/2019 | Hakla | B64D 11/00 |

(Continued)

OTHER PUBLICATIONS

Extended European Search Report for EP 21191527.7-1010, dated Jan. 18, 2022.

*Primary Examiner* — Steven B McAllister
*Assistant Examiner* — Charles R Brawner
(74) *Attorney, Agent, or Firm* — Joseph M. Butscher; The Small Patent Law Group LLC (57) ABSTRACT

A system includes one or more distribution nozzles associated with a seat within an internal space, and a return air grill associated with the seat. Airflow is directed from the one or more distribution nozzles toward and into the return air grill. A method includes associating one or more distribution nozzles with a seat within an internal space, associating a return air grill with the seat, and directing airflow from the one or more distribution nozzles toward and into the return air grill.

19 Claims, 11 Drawing Sheets

(56) References Cited

U.S. PATENT DOCUMENTS

2021/0363361 A1* 11/2021 Poteet .................... B60N 3/004
2021/0394912 A1* 12/2021 Krenz .................... B64D 13/06

* cited by examiner

VENTILATION SYSTEMS AND METHODS FOR INTERNAL CABINS OF VEHICLES

RELATED APPLICATION

This application relates to and claims priority benefits from U.S. Provisional Patent Application No. 63/071,466, entitled "Ventilation Systems and Methods for Internal Cabins of Vehicles," filed Aug. 28, 2020, which is hereby incorporated by reference in its entirety.

FIELD OF THE DISCLOSURE

Embodiments of the subject disclosure generally relate to ventilation systems and methods for internal cabins of vehicle, such as commercial aircraft.

BACKGROUND OF THE DISCLOSURE

Vehicles such as commercial aircraft are used to transport passengers between various locations. Many commercial vehicles such as aircraft have High Efficiency Particulate Air (HEPA) filters in air conditioning systems that are able to entrap microbes and pathogens. The HEPA filters receive and clean air exiting the cabin or about to enter the cabin. HEPA filters and frequent cleaning of the cabin between flights are some methods to ensure the health of the passengers and crew onboard the aircraft.

Further, certain passengers may prefer to wear masks within an internal cabin of a vehicle in order to reduce the risk of spreading pathogens. However, wearing masks during long flights, for example, may be uncomfortable for certain passengers.

SUMMARY OF THE DISCLOSURE

A need exists for a system and a method for preventing, minimizing, or otherwise reducing the spread of pathogens between passengers onboard a vehicle during a trip, such as between passengers in an internal cabin of an aircraft during a flight, without risking harm to the passengers.

With that need in mind, certain embodiments of the subject disclosure provide a system including one or more distribution nozzles associated with a seat within an internal space, and a return air grill associated with the seat. Airflow is directed from the one or more distribution nozzles toward and into the return air grill.

In at least one embodiment, the one or more distribution nozzles are above the seat, and the return air grill is below at least a portion of the seat. For example, the at least a portion of the seat includes a cushion on which a passenger sits.

As an example, the one or more distribution nozzles include at least five distribution nozzles.

In at least one embodiment, an air distribution sub-system provides clean air to the one or more distribution nozzles.

In at least one embodiment, one or more outflow valves are fluidly coupled to the return air grill.

In at least one embodiment, an air filtration sub-system is fluidly coupled to the return air grill.

As an example, the one or more distribution nozzles are part of a passenger service unit within an internal cabin of a vehicle.

In at least one embodiment, a side return air grill is secured to one or both of a sidewall or a floor of the internal space. The return air grill is fluidly coupled to the side return air grill.

In at least one embodiment, the return air grill is secured to a floor of the internal space. In at least one other embodiment, the return air grill is secured to a portion of the seat.

As a further example, the system also includes one or more additional distribution nozzles within the internal space.

As a further example, the system includes a plenum mounted to a floor of the internal space. The plenum includes a filter and a fan.

Certain embodiments of the subject disclosure provide a method including associating one or more distribution nozzles with a seat within an internal space; associating a return air grill with the seat; directing airflow from the one or more distribution nozzles toward and into the return air grill.

Certain embodiments of the subject disclosure provide a vehicle including an internal cabin, a plurality of seats within the internal cabin, and a ventilation system including one or more distribution nozzles and a return air grill associated with each of the plurality of seats. Airflow is directed from the one or more distribution nozzles toward and into the return air grill.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the subject disclosure provide a ventilation system for an internal space (for example, an internal cabin of a vehicle, such as a commercial aircraft). The ventilation system includes one or more distribution nozzles associated with a seat, and a return air grill associated with the seat. In at least one embodiment, each seat within the internal cabin has one or more distribution nozzles and a return air grill associated therewith. For example, the one or more distribution nozzles are disposed above the seat, and the return air grill is mounted below and/or on a portion of the seat. In this manner, airflow is directed into a downward vertical direction in relation to the seat. By providing a downwardly directed airflow with respect to the seat, fresh, clean air is provided to a passenger in the seat while also minimizing or otherwise reducing introduction of air (such as from passengers seated by the seat) into a breathing zone. The air is received by the return air grill and directed away from the passenger and other passengers within the internal cabin. In this manner, embodiments of the subject disclosure are configured to provide plug air flow (also referred to as unidirectional flow or piston flow), or performance approaching plug air flow, within the internal cabin, which minimizes or otherwise reduces a potential of pathogen transmission among the passengers within the internal cabin.

Certain embodiments of the subject disclosure provide a ventilation system that provides airflow above passengers. The airflow moves vertically downward to return air grills associated with seats within the internal cabin. The downward, vertical airflow provides a path of clean air to passengers and ventilates exhaled air from the passengers away from other passengers. The ventilation systems and methods described herein reduce the spread of pathogens within an internal cabin of a vehicle.

Figure 1:
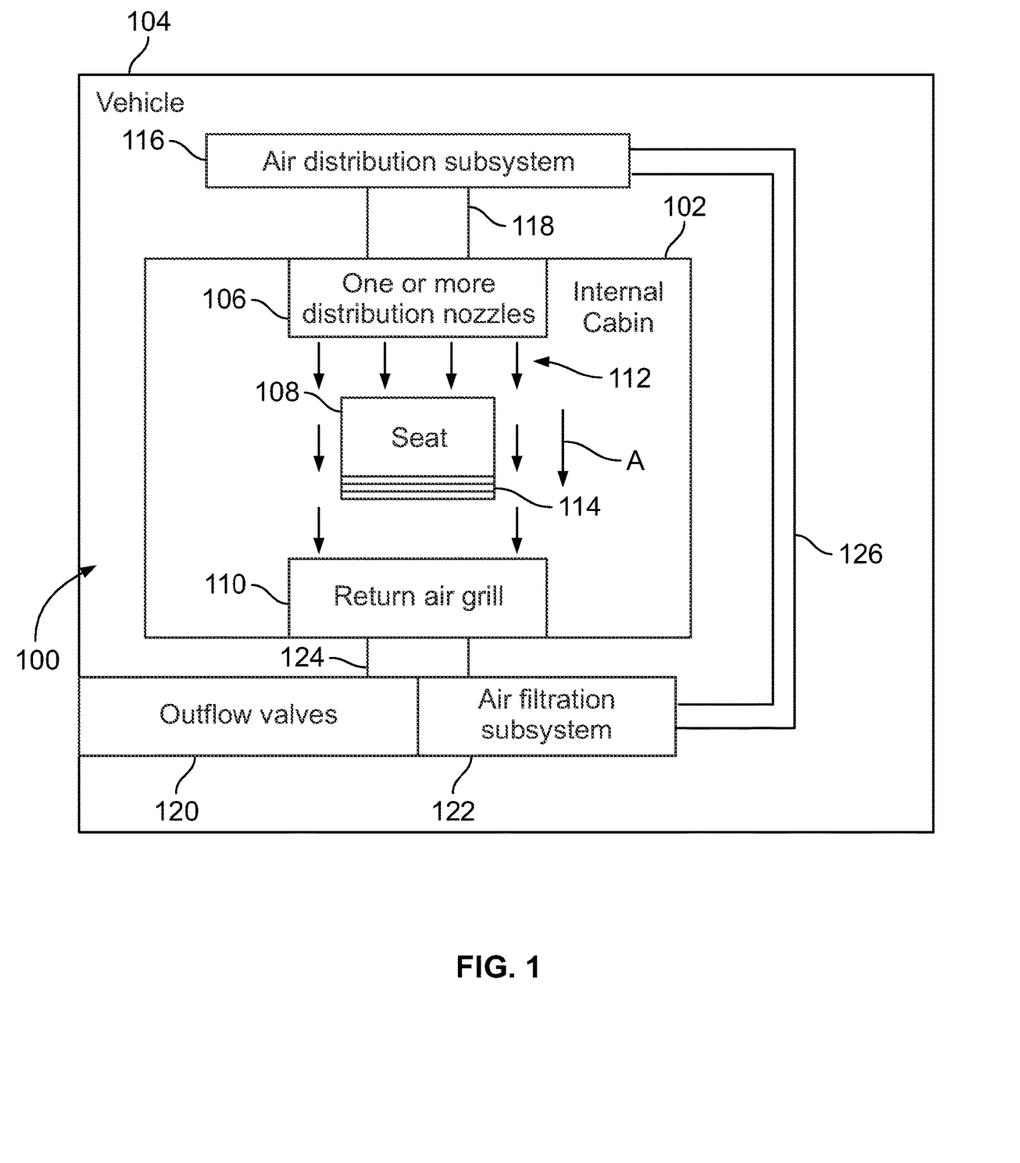
FIG. 1 illustrates a schematic diagram of a ventilation system for an internal cabin of a vehicle, according to an embodiment of the subject disclosure.

FIG. 1 illustrates a schematic diagram of a ventilation system 100 for an internal cabin 104 of a vehicle 104, according to an embodiment of the subject disclosure. In at least one embodiment, the vehicle 104 is a commercial aircraft. The internal cabin 104 is an example of an internal space. Other examples of internal spaces include rooms within buildings.

The ventilation system 100 includes one or more distribution nozzles 106 associated with a seat 108 within the internal cabin 104. For example, each seat 108 is assigned, or otherwise served by its own distribution nozzle(s) 106. Further, a return air grill 110 is associated with the seat 108. For example, each seat 108 is assigned or otherwise serviced by its own return air grill 110.

In at least one embodiment, the one or more distribution nozzles 106 are above the seat 108, and the return air grill 110 is secured (for example, mounted) below the seat 108 and/or on a portion of the seat 108. In at least one embodiment, each seat 108 within the internal cabin 104 is associated with one or more distribution nozzles 106 and a return air grill 110. In at least one other embodiment, less than all of the seats 108 within the internal cabin 104 are associated with one or more distribution nozzles 106 and a return air grill 110.

In at least one embodiment, the one or more distribution nozzles 106 include at least two distribution nozzles 106. For example, five or more distribution nozzles 106 can be associated with the seat 108. Increasing the number of distribution nozzles 106 in the internal cabin 102 reduces a flow rate of, but more evenly distributes, airflow 112 out of the distribution nozzles 106. Optionally, a single distribution nozzle 106 is associated with the seat 108.

In at least one embodiment, the distribution nozzle(s) 106 are configured to provide an air curtain directing airflow toward the return air grill 110. The air curtain can be directed in front of, to a side, and/or behind a passenger within the seat 108.

The distribution nozzles(s) 106 are disposed above the seat 108, and the return air grill 110 is disposed below a cushion 114 of the seat 108 on which a passenger sits. As such, the airflow 112 is downwardly directed from the distribution nozzle(s) 106 to the return air grill 110. Because the airflow 112 is downwardly directed in a vertical direction from the distribution nozzle(s) 106 to the return air grill 110, the airflow 112 has reduced turbulence or mixing. As such, the airflow 112 is able to smoothly flow around obstructions, such as portions of the seat 108 and the passengers sitting on the seat 108. In this manner, clean, fresh air is provided to the passenger on the seat 108. The passenger breathes in the fresh, clean air, and exhales air that is then directed by the downwardly-flowing airflow 112 into the return air grill 110. Accordingly, contaminants, pathogens, or the like are less likely to mix into the air within the internal cabin 104, but are instead drawn into the return air grill 110. Optionally, the airflow 112 can be turbulent or semi-turbulent.

In at least one embodiment, the airflow 112 is directed over a head of a passenger and/or into and/or toward a breathing zone of the passenger. As such, the airflow 112 entrains expelled bioaerosols (such as from talking, sneezing, coughing, breathing, or the like), which are then directed to the return air grill 110.

The distribution nozzle(s) 106 are fluidly coupled to an air distribution sub-system 116 of the vehicle 104 through one or more air conduits 118, such as one or more ducts, one or more tubes, one or more plenums, and/or the like. The return air grill 110 is fluidly coupled to one or more outflow valves 120 and/or an air filtration sub-system 122 (such as can include one or more air filters, fans, and the like) through one or more air conduits 124, such as one or more ducts, one or more tubes, one or more plenums, and/or the like. The air filtration sub-system 122 is, in turn, fluidly coupled to the air distribution sub-system 116 through one or more air conduits 126, such as one or more ducts, one or more tubes, one or more plenums, and/or the like. Optionally, the ventilation system 100 may not include the air filtration sub-system 122. Instead, the return air grill 110 can be coupled to just the outflow valve(s) 120. As another option, the ventilation system 100 may not include the outflow valve(s) 120. Instead, the return air grill 110 can be coupled to just the air filtration sub-system 122.

In operation, the air distribution sub-system 116 provides fresh, clean air to the one or more distribution nozzles 106. For example, the air distribution sub-system 116 provides fresh, clean air drawn from outside the vehicle 104 to the distribution nozzle(s) 106. As a further example with respect to a commercial aircraft, air is drawn off engines and is received by an air conditioning sub-system, such as can be below or otherwise proximate to a wing box. The air conditioning sub-system receives high pressure hot air from the engines and conditions the air, which is then output as cold, dry and low pressure air, which is then delivered to a bulkhead in a pressurized area of the aircraft. The air can then be mixed in a mixing bay, which also receives purified and cleaned air from the air filtration sub-system 122. The mixed air can then be delivered as fresh clean air by the air distribution sub-system 116.

The distribution nozzles 106 receive the clean, fresh air from the air distribution sub-system 116 and output the airflow 112, which is laminar, in the downward vertical direction from above a passenger in the seat 108 toward the return air grill 110 in the direction of arrow A (that is, from above the passenger to below the passenger). Alternatively, the airflow 112 can be turbulent or semi-turbulent. As such, the passenger in the seat 108 is provided with fresh, clean air. Air that is exhaled by the passenger in the seat 108 is drawn downwardly by the airflow 112 into the return air grill 110 and/or onto surfaces (such as a floor, arm rests, clothing of a passenger, and/or the like), which can later be cleaned. Therefore, exhaled air from the passenger, including any contaminants, pathogens, or the like, is not mixed into the air of the internal cabin 104, but is instead drawn into the return air grill 110. The airflow received by the return air grill 110 is then delivered to the outflow valves 120, which exhaust the air out of the vehicle 104, and/or into the air filtration sub-system 122, which includes filters (such as HEPA filters), which remove contaminants, pathogens, and the like from the air. The purified air is then delivered to the air distribution sub-system 116 through the air conduit(s) 126.

As described herein, the ventilation system 100 includes the one or more distribution nozzles 106 associated with the seat 108 within an internal space, such as the internal cabin 104. The return air grill 110 is also associated with the seat 108. The airflow 112 is directed from the one or more distribution nozzles 106 toward and into the return air grill 110.

Further, in at least one embodiment, the vehicle 104 includes the internal cabin 104. A plurality of seats 108 are within the internal cabin 104. The ventilation system 100 includes one or more distribution nozzles 106 and a return air grill 110 associated with each of the plurality of seats 108. The airflow 112 is directed from the one or more distribution nozzles 106 toward and into the return air grill 110.

Figure 2:
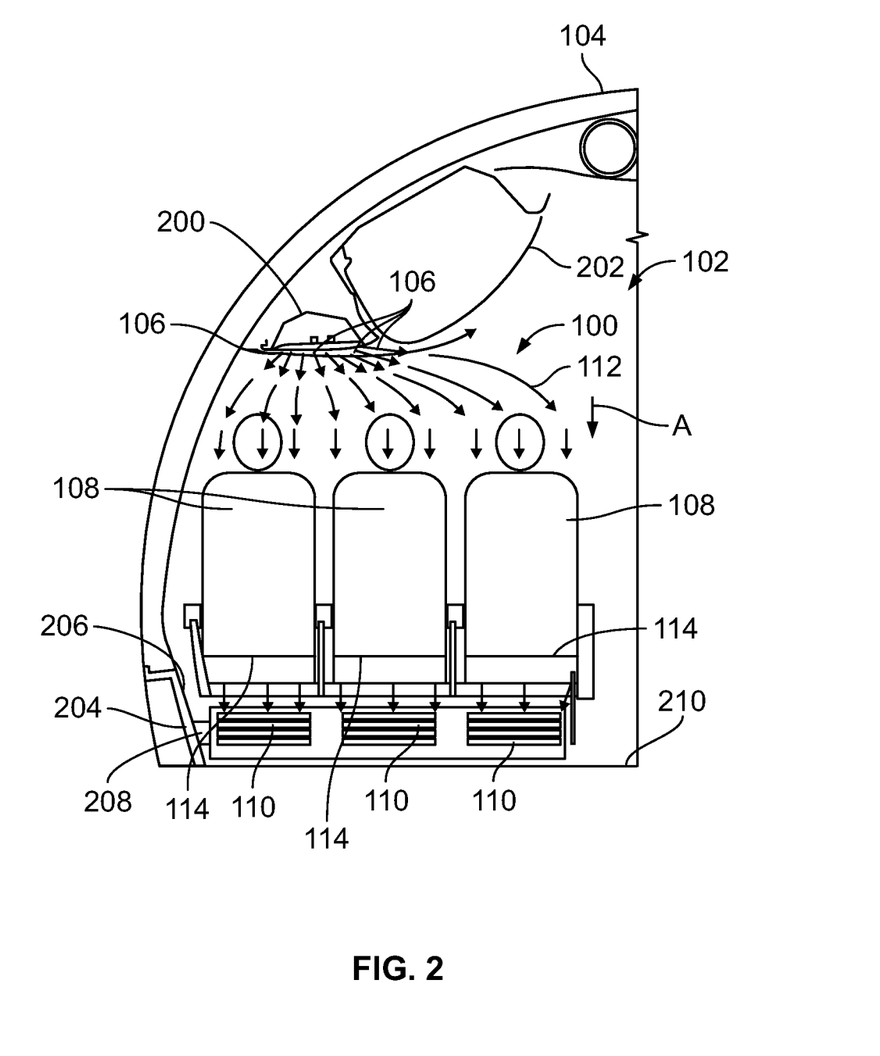
FIG. 2 illustrates an internal view of a portion of the internal cabin of the vehicle, according to an embodiment of the subject disclosure.

FIG. 2 illustrates an internal view of a portion of the internal cabin 104 of the vehicle 104, according to an embodiment of the present disclosure. As shown, three seats 108 can be within a row. Distribution nozzles 106 are disposed above each seat 108. Further, a return air grill 110 is disposed below a cushion 114 of each seat 108. The airflow 112 flows in a downward direction, as denoted by the arrow A, from the distribution nozzles 106 over and around the seats 108 (and passengers within the seats 108) to the return air grills 110.

In at least one embodiment, the distribution nozzles 106 are part of, connected to, or otherwise proximate to (such as mounted within 6 inches or less) a passenger service unit (PSU) 200 that is outboard and below a stowage bin assembly 202. Further, the return air grills 110 are fluidly coupled to the a side return air grill 204, such as secured to a sidewall 206 proximate to a floor 210 of the internal cabin 102, through an air conduit 208. Air received by the return air grills 110 associated with the seats 108 is drawn into the side return air grill 204, and can then be drawn by low pressure into the outflow valves 120 and/or the air filtration sub-system 122, which can be underneath a floor 210 of the internal cabin 104. Optionally, the return air grill 110 can be directly coupled to outflow valves 120 and/or the air filtration sub-system 122 without being in fluid communication with the side return air grill 204.

In at least one embodiment, the distribution nozzles 106 are part of the PSU 200. For example, the distribution nozzles 106 are air nozzles, outlets, or the like of the PSU 200. In at least one other embodiment, the distribution nozzles 106 are distinct from the PSU 200. For example, the distribution nozzles 106 can be part of a gasper air source.

In at least one embodiment, a plurality of distribution nozzles 106 are associated with each seat 108. For example, four to ten distribution nozzles 106 are associated with each seat 108. Alternatively, a single distribution nozzle 106 is associated with each seat 108. As another example, one or more distribution nozzles 106 are configured to downwardly direct an air curtain that is directed in front of one or more seat, in front of a passenger in a seat, to a side of the passenger, and/or the like. For example, the distribution nozzle(s) 106 are aimed toward the return air grill 110 so that the air curtain entrains cabin air and air exhaled by the passenger in the seat 108, which then flows to the return air grill 110.

Figure 3:
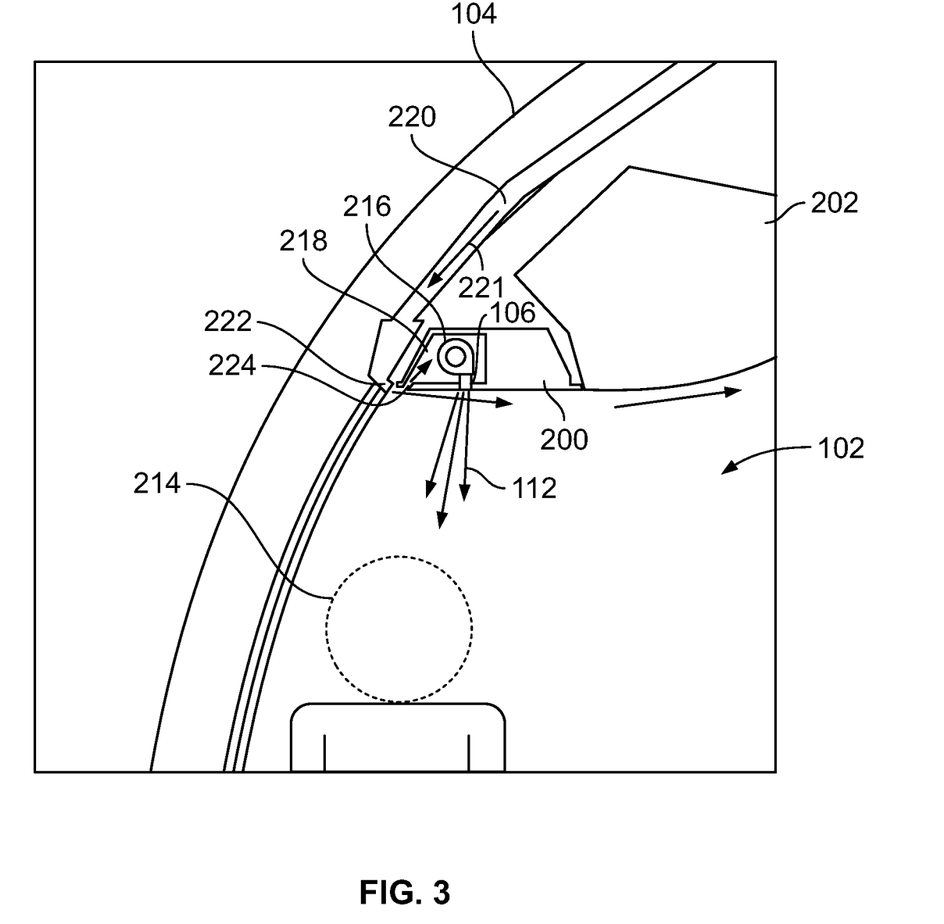
FIG. 3 illustrates a simplified internal view of a portion of the internal cabin in which a distribution nozzle is disposed over a passenger, according to an embodiment of the subject disclosure.

FIG. 3 illustrates a simplified internal view of a portion of the internal cabin 104 in which a distribution nozzle 106 is disposed over a passenger 214, according to an embodiment of the subject disclosure. As one non-limiting example, the distribution nozzle 106 is coupled to one or more gasper boost fans 216 mounted within a plenum 218 of the PSU 200.

Fresh air 221 from the air distribution sub-system 116 (shown in FIG. 1) is delivered to the gasper boost fan 216 via an air distribution duct 220. The fresh air 221 passes out of an outlet 222 of the air distribution duct 220 and is drawn into an inlet 224 of the PSU 200, such as via the gasper boost fan 216. The gasper boost fan 216 then outputs the fresh air 221 via the distribution nozzle 106 as the airflow 112 over the passenger 214 and toward the return air grill 110 (shown in FIGS. 1 and 2), as described herein. As another example, general cabin air is drawn into the PSU 200 by the gasper boost fan 216, run through a HEPA filter within the PSU 200, and then exhausted out of the distribution nozzles 106 toward the return air grill.

Figure 4:
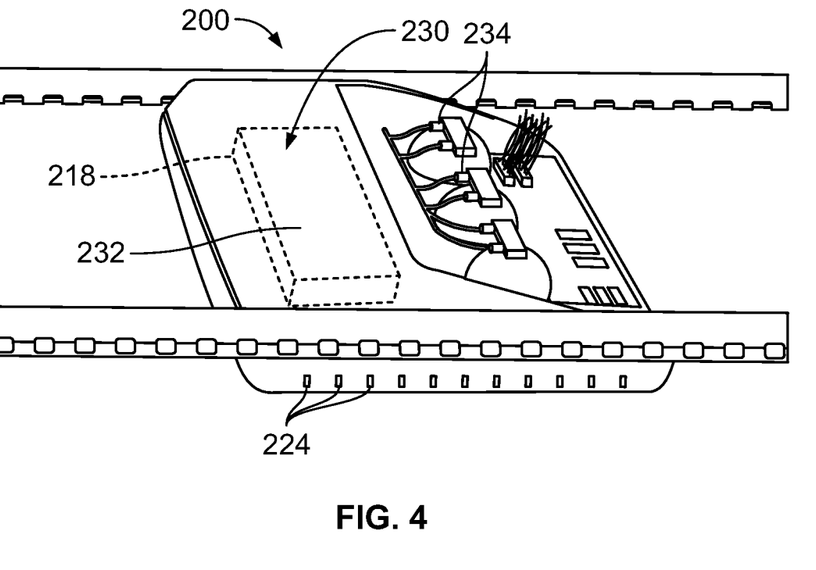
FIG. 4 illustrates a perspective top view of a passenger service unit, according to an embodiment of the subject disclosure.
Figure 5:
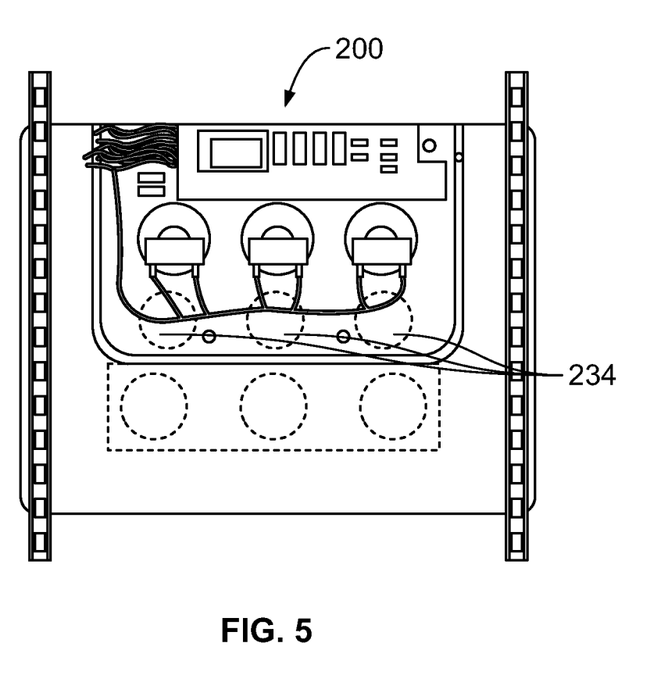
FIG. 5 illustrates a top view of the passenger service unit of FIG. 4.

FIG. 4 illustrates a perspective top view of the PSU 200 of FIG. 3, according to an embodiment of the subject disclosure. FIG. 5 illustrates a top view of the passenger service unit 200 of FIG. 4. Referring to FIGS. 3-5, one or more fans 230 and/or filters 232 (such as HEPA filters) can be disposed within the plenum 218. A plurality of inlets 224 can be formed in the PSU 200. Outlets 234 are formed in the PSU 200. The distribution nozzles 106 extend into and/or through the outlets 234.

The PSU 200 can include a plurality of distribution nozzles 106. For example, the PSU 200 can include at least three distribution nozzles 106.

FIGS. 3-5 show a non-limiting example of distribution nozzle(s) 106 as part of the PSU 200. It is to be understood that such is merely an example. The PSU 200 can include more or less distribution nozzles 106 than shown. Further, the distribution nozzles 106 can be arranged differently than shown. As another example, the distribution nozzle 106 can be separate and distinct from the PSU 200. That is, the PSU 200 may not include distribution nozzles 106 as described herein. Further, the distribution nozzle(s) 106 may or may not be directly or indirectly coupled to gasper boost fan(s).

Figure 6:
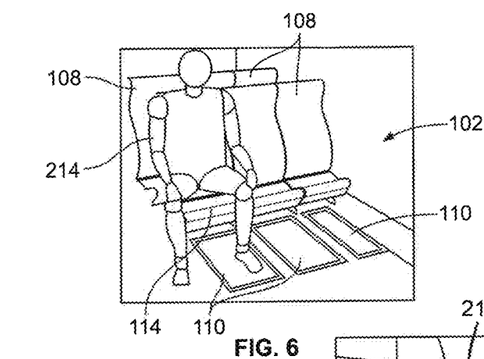
FIG. 6 illustrates a perspective view of a passenger in a seat within the internal cabin, according to an embodiment of the subject disclosure.

FIG. 6 illustrates a perspective view of the passenger 214 in a seat 108 within the internal cabin 104, according to an embodiment of the subject disclosure. As shown, the return air grill 110 is mounted on (and/or within) the floor 210 of the internal cabin 104 below the cushion 114. In at least one embodiment, a return air grill 110 is below a cushion 114 of each seat 108.

Figure 7:
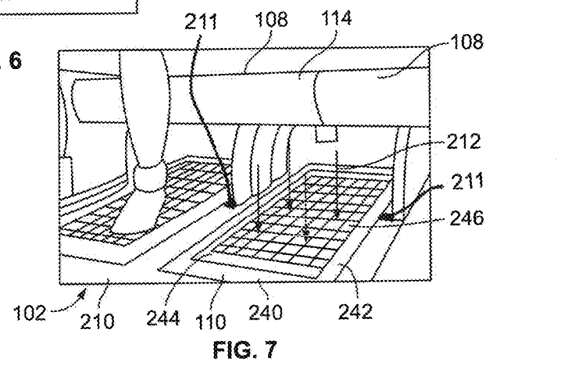
FIG. 7 illustrates a perspective view of a return air grill secured underneath a cushion of a seat, according to an embodiment of the subject disclosure.

FIG. 7 illustrates a perspective view of a return air grill 110 secured underneath a cushion 114 of a seat 108, according to an embodiment of the subject disclosure. In at least one example, the return air grill 110 includes a housing 240 having a perimeter frame 242 that retains a panel 244 having a plurality of inlet passages 246. The airflow 212 is drawn into the return air grill 110 through the inlet passages 246. The return air grill 110 can include internal baffles to balance received airflow 112. The return air grill 110 can be a mat that is supported on the floor 210. Optionally, the return air grill 110 can be at least partially recessed into the floor 210.

In at least one embodiment, the return air grill 110 attaches to seat track fittings 211 of the seat 108. The seat track fittings 211 secure the seats to seat tracks within the internal cabin 104. Optionally, the return air grill 110 does not attach to seat track fittings. For example, the return air grill 110 can be directly secured to the floor 210, such as through separate and distinct fasteners, adhesives, and/or the like. As another example, the return air grill 110 can be integrally formed with the floor 210.

In at least one embodiment, the return air grill 110 is coupled to the side return air grill 204 (shown in FIG. 2) through the conduit 208. As an example, the air conduit 208 can be or otherwise include a flexible hose, tube, or the like.

Referring to FIGS. 6 and 7, the return air grill 110 is parallel with the floor 210. For example, the return air grill 110 is horizontally oriented in relation to the internal cabin 104. Optionally, the return air grill 110 can be differently oriented.

Figure 8:
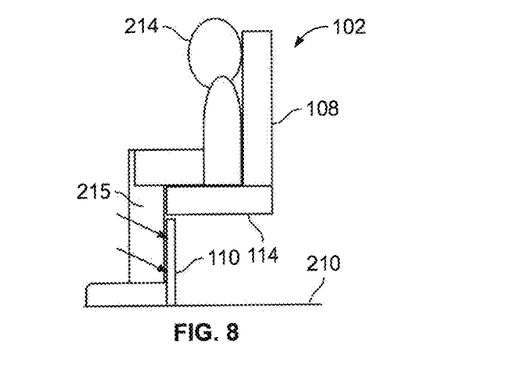
FIG. 8 illustrates a simplified lateral view of a seat, according to an embodiment of the subject disclosure.

FIG. 8 illustrates a simplified lateral view of a seat 108, according to an embodiment of the subject disclosure. In this embodiment, the return air grill 110 is below the cushion 114, but is orthogonal to the floor 210. For example, the return air grill 110 is upright in relation to the floor, such as vertically oriented in relation to the internal cabin 104. In at least one embodiment, the return air grill 110 is mounted to at least a portion of the seat 108, such as one or more portions of legs that support the seat 108 on the floor 210. As shown, the return air grill 110 can be disposed below the cushion 114 and configured to be behind calves 215 of the sitting passenger 214.

Figure 9:
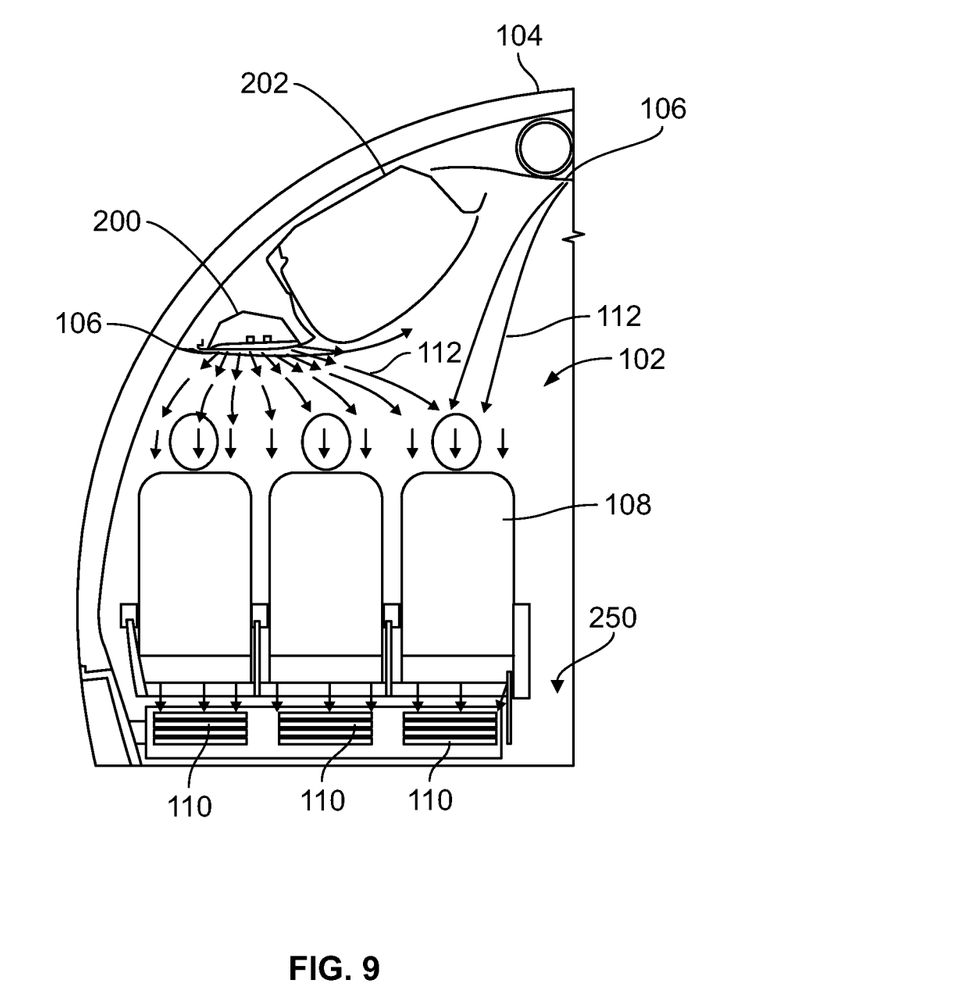
FIG. 9 illustrates an internal view of a portion of the internal cabin of the vehicle, according to an embodiment of the subject disclosure.

FIG. 9 illustrates an internal view of a portion of the internal cabin 104 of the vehicle 104, according to an embodiment of the subject disclosure. In this embodiment, in addition to the distribution nozzles 106 that are directly over one or more of the seats 108, one or more distribution nozzles 106 are also above an aisle 250 within the internal cabin 104. For example, additional distribution nozzles 106 are at centerline ceiling positions within the internal cabin 104. The distribution nozzles 106 provide additional airflow 112, such as to inboard passengers that may not be directly underneath a distribution nozzle 106.

Figure 10:
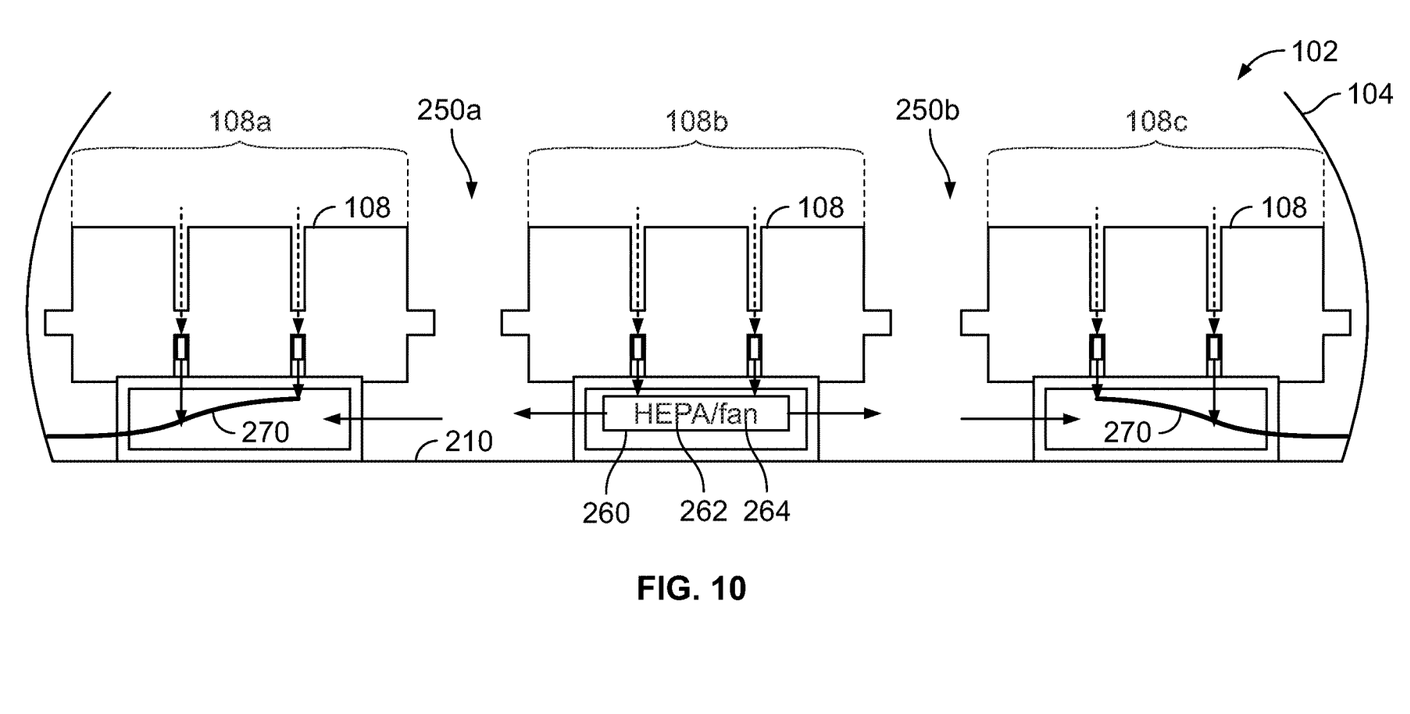
FIG. 10 illustrates an internal view of a portion of the internal cabin of the vehicle, according to an embodiment of the subject disclosure.

FIG. 10 illustrates an internal view of a portion of the internal cabin 104 of the vehicle 104, according to an embodiment of the subject disclosure. In at least one example, the internal cabin 104 includes a first outboard group 108a of seats 108, a middle group 108b of seats 108, and a second outboard group 108c of seats 108. The first outboard group 108a is separated from the middle group 108b by a first aisle 250a and the second outboard group 108c is separated from the middle group 108b by a second aisle 250b.

As an example, the middle group 108b of seats 108 includes a floor-mounted 9 or seat-mounted) plenum 260 having a filter 262 (such as a HEPA filter) and a fan 264. Air is drawn into the plenum 260 by the fan 264, routed through the filter 262, and ejected into the aisles 250a and 250b proximate to the floor 210. Floor mounted plenums 270 of the first outboard group 108a and the second outboard group 108c draw the air ejected from the plenum 260 and route the drawn air to the side return air grill 208 (shown in FIG. 1), the return air grills 110, and/or the like, as described herein.

Referring to FIGS. 1-10, embodiments of the subject disclosure provide systems and methods for generating the airflow 112 (such as smooth, laminar airflow) over passengers within the internal cabin 104. The airflow 112 flows in a top-down direction from distribution nozzles 106 above the passengers toward and into return air grills 110 disposed below at least portions of the passengers. The smooth, laminar flow provides fresh, clean air for the passengers to breathe, while also drawing exhaled air into the return air grills 110, thereby preventing, minimizing, or otherwise reducing the potential of the exhaled air from remaining within the internal cabin 104 (in contrast to turbulent, circular flow of air).

Figure 11:
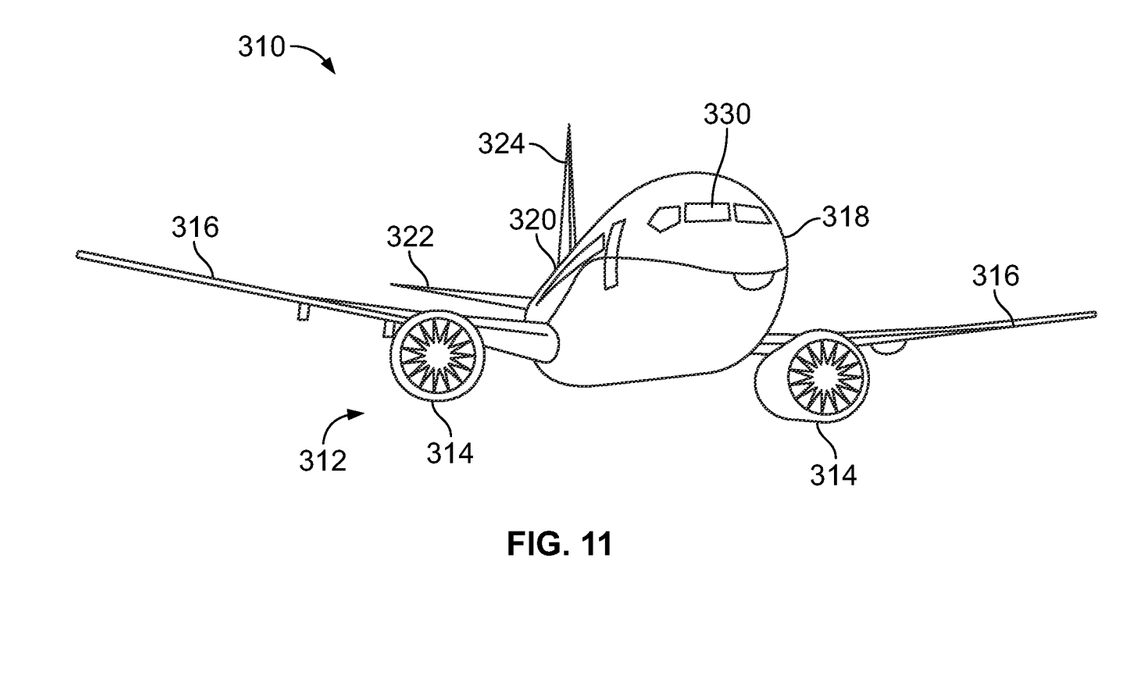
FIG. 11 illustrates a perspective front view of an aircraft, according to an embodiment of the subject disclosure.

FIG. 11 illustrates a perspective front view of an aircraft 310, according to an embodiment of the subject disclosure. The aircraft 310 is an example of the vehicle 104 shown in FIG. 1.

The aircraft 310 includes a propulsion system 312 that includes engines 314, for example. Optionally, the propulsion system 312 can include more engines 314 than shown. The engines 314 are carried by wings 316 of the aircraft 310. In other embodiments, the engines 314 can be carried by a fuselage 318 and/or an empennage 320. The empennage 320 can also support horizontal stabilizers 322 and a vertical stabilizer 324.

The fuselage 318 of the aircraft 310 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like.

Alternatively, instead of an aircraft, embodiments of the subject disclosure can be used with various other vehicles, such as automobiles, buses, locomotives and train cars, watercraft, and the like. Further, embodiments of the subject disclosure can be used with respect to fixed structures, such as commercial and residential buildings (for example, theaters, concert venues, auditoriums, classrooms, stadiums, grocery stores, office buildings, hospitals, and the like).

Figure 12A:
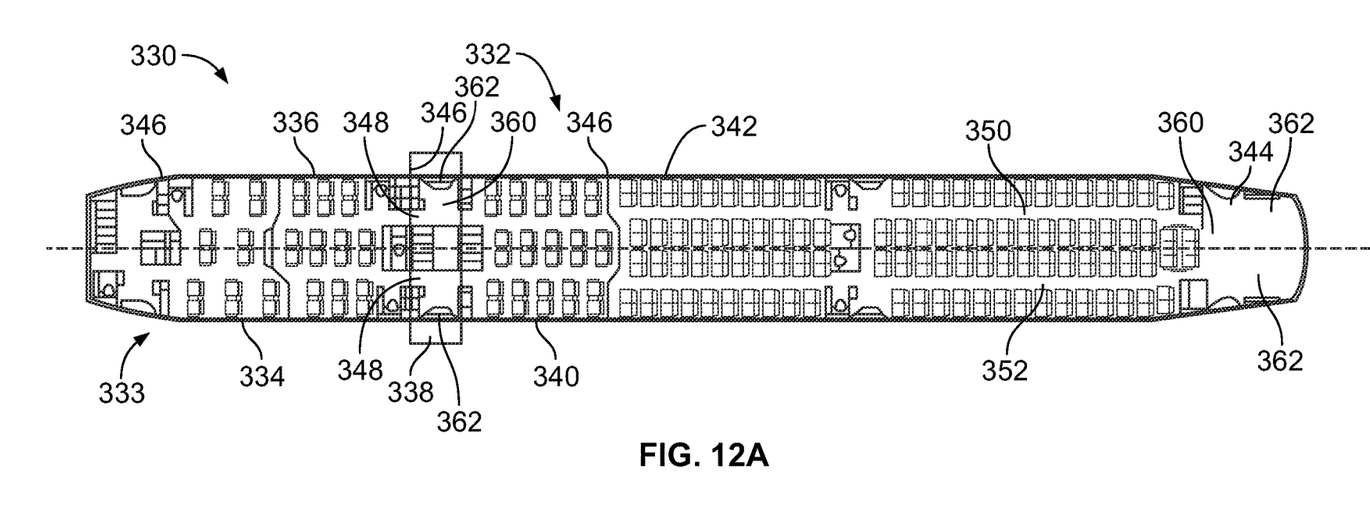
FIG. 12A illustrates a top plan view of an internal cabin of an aircraft, according to an embodiment of the subject disclosure.

FIG. 12A illustrates a top plan view of an internal cabin 330 of an aircraft, according to an embodiment of the subject disclosure. The internal cabin 330 can be within the fuselage 332 of the aircraft, such as the fuselage 318 of FIG. 11. For example, one or more fuselage walls can define the internal cabin 330. The internal cabin 330 includes multiple sections, including a front section 333, a first class section 334, a business class section 336, a front galley station 338, an expanded economy or coach section 340, a standard economy of coach section 342, and an aft section 344, which can include multiple lavatories and galley stations. It is to be understood that the internal cabin 330 can include more or less sections than shown. For example, the internal cabin 330 may not include a first class section, and can include more or less galley stations than shown. Each of the sections can be separated by a cabin transition area 346, which can include class divider assemblies between aisles 348.

As shown in FIG. 12A, the internal cabin 330 includes two aisles 350 and 352 that lead to the aft section 344. Optionally, the internal cabin 330 can have less or more aisles than shown. For example, the internal cabin 330 can include a single aisle that extends through the center of the internal cabin 330 that leads to the aft section 344.

The aisles 348, 350, and 352 extend to egress paths or door passageways 360. Exit doors 362 are located at ends of the egress paths 360. The egress paths 360 can be perpendicular to the aisles 348, 350, and 352. The internal cabin 330 can include more egress paths 360 at different locations than shown. The ventilation system 100 shown and described with respect to FIGS. 1-10 is configured to be used within the internal cabin 330.

Figure 12B:
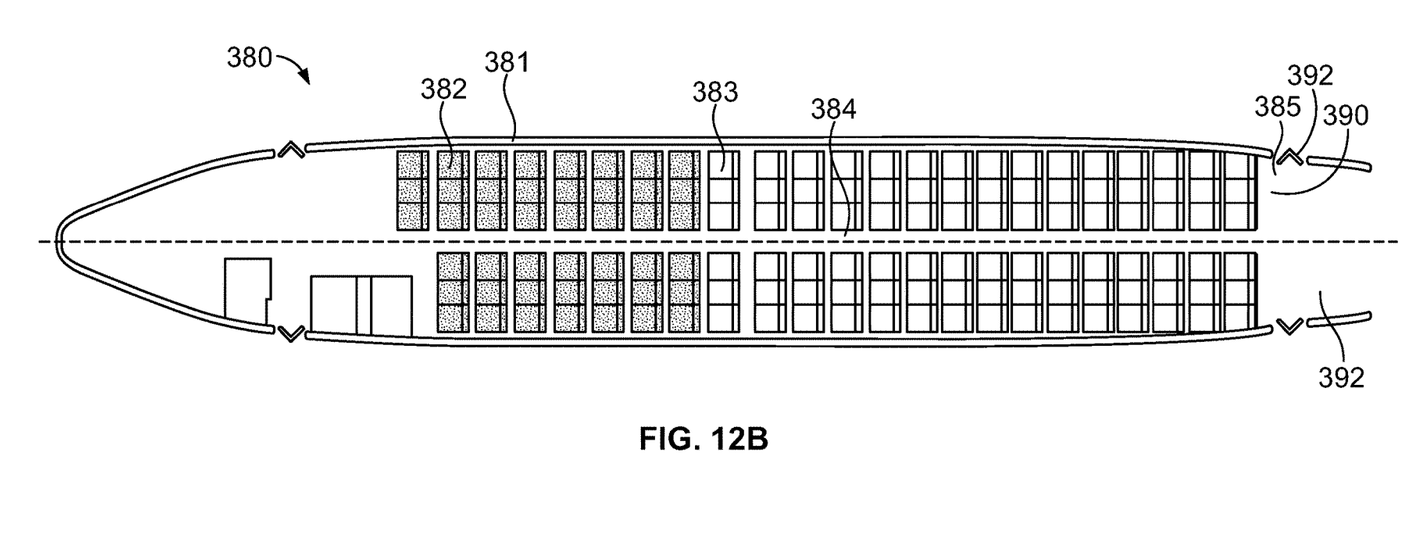
FIG. 12B illustrates a top plan view of an internal cabin of an aircraft, according to an embodiment of the subject disclosure.

FIG. 12B illustrates a top plan view of an internal cabin 380 of an aircraft, according to an embodiment of the subject disclosure. The internal cabin 380 is an example of the internal cabin 330 shown in FIG. 11. The internal cabin 380 can be within a fuselage 381 of the aircraft. For example, one or more fuselage walls can define the internal cabin 380. The internal cabin 380 includes multiple sections, including a main cabin 382 having passenger seats 383, and an aft section 385 behind the main cabin 382. It is to be understood that the internal cabin 380 can include more or less sections than shown.

The internal cabin 380 can include a single aisle 384 that leads to the aft section 385. The single aisle 384 can extend through the center of the internal cabin 380 that leads to the aft section 385. For example, the single aisle 384 can be coaxially aligned with a central longitudinal plane of the internal cabin 380.

The aisle 384 extends to an egress path or door passageway 390. Exit doors 392 are located at ends of the egress path 390. The egress path 390 can be perpendicular to the aisle 384. The internal cabin 380 can include more egress paths than shown. The ventilation system 100 shown and described with respect to FIGS. 1-10 is configured to be used within the internal cabin 380.

Figure 13:
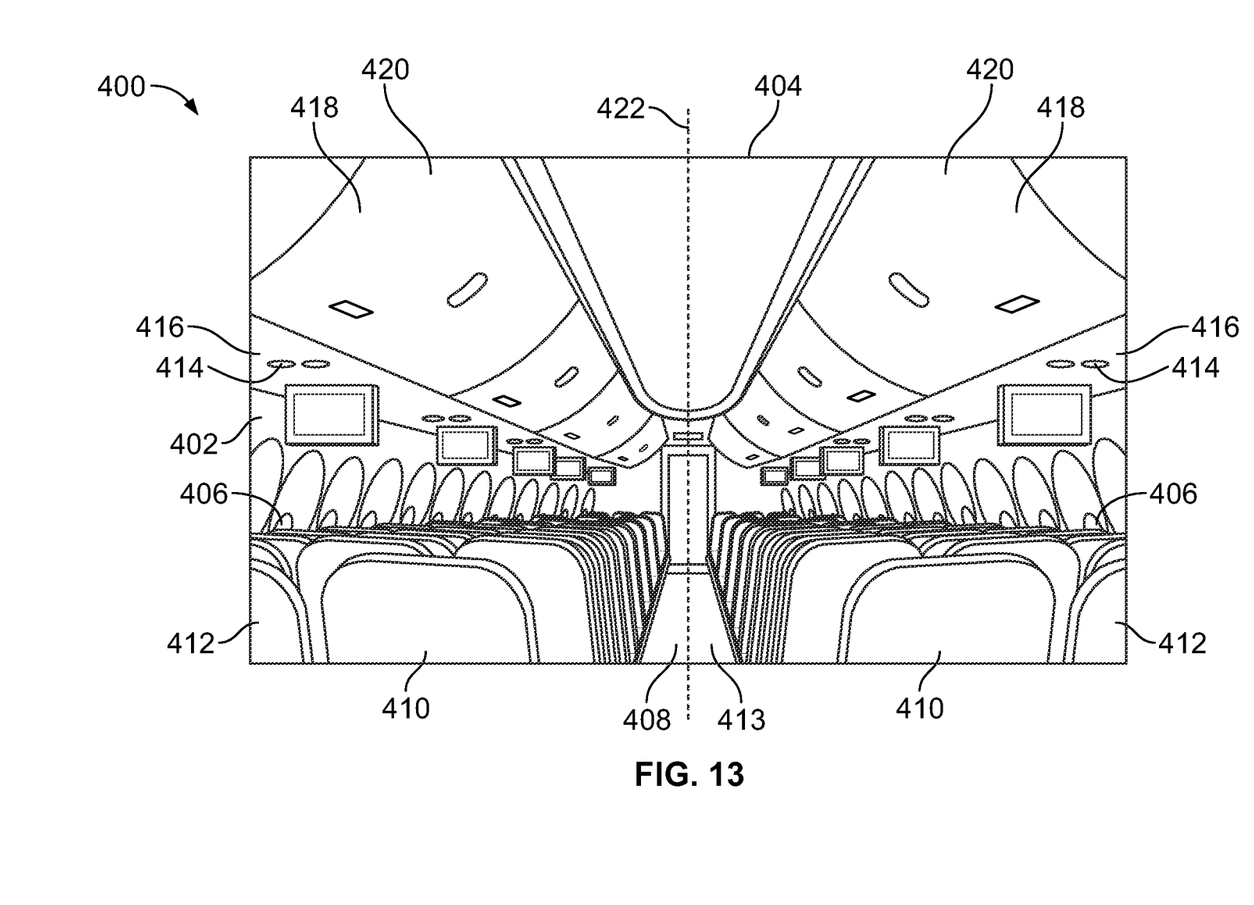
FIG. 13 illustrates a perspective interior view of an internal cabin of an aircraft, according to an embodiment of the subject disclosure.

FIG. 13 illustrates a perspective interior view of an internal cabin 400 of an aircraft, according to an embodiment of the subject disclosure. The internal cabin 400 includes outboard walls 402 connected to a ceiling 404. Windows 406 can be formed within the outboard walls 402. A floor 408 supports rows of seats 410. As shown in FIG. 13, a row 412 can include two seats 410 on either side of an aisle 413. However, the row 412 can include more or less seats 410 than shown. Additionally, the internal cabin 400 can include more aisles than shown.

PSUs 414 are secured between an outboard wall 402 and the ceiling 404 on either side of the aisle 413. The PSUs 414 extend between a front end and a rear end of the internal cabin 400. For example, a PSU 414 can be positioned over each seat 410 within a row 412. Each PSU 414 can include a housing 416 that generally contains vents, reading lights, an oxygen bag drop panel, an attendant request button, and other such controls over each seat 410 (or groups of seats) within a row 412.

Overhead stowage bin assemblies 418 are secured to the ceiling 404 and/or the outboard wall 402 above and inboard from the PSU 414 on either side of the aisle 413. The overhead stowage bin assemblies 418 are secured over the seats 410. The overhead stowage bin assemblies 418 extend between the front and rear end of the internal cabin 400. Each stowage bin assembly 418 can include a pivot bin or bucket 420 pivotally secured to a strongback (hidden from view in FIG. 24). The overhead stowage bin assemblies 418 can be positioned above and inboard from lower surfaces of the PSUs 414. The overhead stowage bin assemblies 418 are configured to be pivoted open in order to receive passenger carry-on baggage and personal items, for example.

As used herein, the term "outboard" means a position that is further away from a central longitudinal plane 422 of the internal cabin 400 as compared to another component. The term "inboard" means a position that is closer to the central longitudinal plane 422 of the internal cabin 400 as compared to another component. For example, a lower surface of a PSU 414 can be outboard in relation to a stowage bin assembly 418.

The ventilation system 100 shown and described with respect to FIGS. 1-10 is configured to be used within the internal cabin 400.

Figure 14:
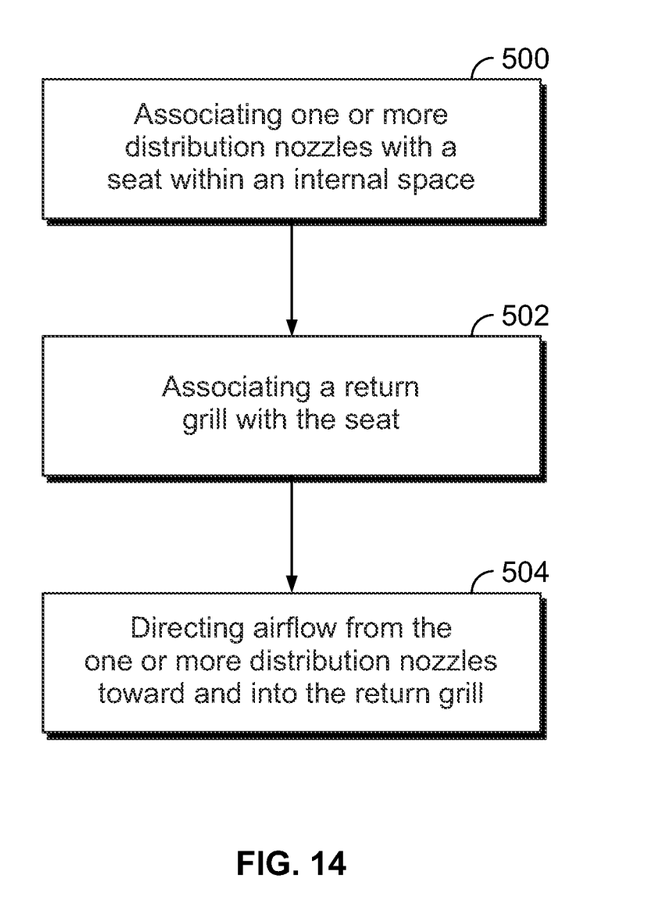
FIG. 14 illustrates a flow chart of a ventilation method for an internal space, such as an internal cabin of a vehicle, according to an embodiment of the subject disclosure.

FIG. 14 illustrates a flow chart of a ventilation method for an internal space, such as an internal cabin of a vehicle, according to an embodiment of the subject disclosure. The method includes associating, at 500, one or more distribution nozzles with a seat within an internal space; associating, at 502, a return air grill with the seat; and directing, at 504, airflow from the one or more distribution nozzles toward and into the return air grill.

In at least one example, said associating the one or more distribution nozzles includes disposing the one or more distribution nozzles above the seat. Further, in at least one example, said associating the return air grill includes disposing the return air grill below at least a portion of the seat.

In at least one example, the method also includes providing, by an air distribution sub-system, clean air to the one or more distribution nozzles.

In at least one example, the method also includes fluidly coupling one or more outflow valves to the return air grill.

In at least one example, the method also includes fluidly coupling an air filtration sub-system to the return air grill.

In at least one example, the method also includes securing a side return air grill to one or both of a sidewall or a floor of the internal space; and fluidly coupling the return air grill to the side return air grill.

As a further example, the method includes securing the return air grill to a floor of the internal space. As another example, the method includes securing the return air grill to a portion of the seat.

In at least one embodiment, the method also includes providing one or more additional distribution nozzles within the internal space.

In at least one embodiment, the method further includes mounting a plenum having a filter and a fan to a floor of the internal space.

As described herein, embodiments of the subject disclosure provide systems and methods for preventing, minimizing, or otherwise reducing the spread of pathogens between passengers onboard a vehicle during a trip, such as between passengers in an internal cabin of an aircraft during a flight, without risking harm to the passengers.

Further, the disclosure comprises embodiments according to the following clauses:

Clause 1. A system comprising:
one or more distribution nozzles associated with a seat within an internal space; and
a return air grill associated with the seat,
wherein airflow is directed from the one or more distribution nozzles toward and into the return air grill.

Clause 2. The system of Clause 1, wherein the one or more distribution nozzles are above the seat, and wherein the return air grill is below at least a portion of the seat.

Clause 3. The system of Clause 2, wherein the at least a portion of the seat comprises a cushion on which a passenger sits.

Clause 4. The system of any of Clauses 1-3, wherein the one or more distribution nozzles comprise at least five distribution nozzles.

Clause 5. The system of any of Clauses 1-4, further comprising an air distribution sub-system that provides clean air to the one or more distribution nozzles.

Clause 6. The system of any of Clauses 1-5, further comprising one or more outflow valves fluidly coupled to the return air grill.

Clause 7. The system of any of Clauses 1-6, further comprising an air filtration sub-system fluidly coupled to the return air grill.

Clause 8. The system of any of Clauses 1-7, wherein the one or more distribution nozzles are part of a passenger service unit within an internal cabin of a vehicle.

Clause 9. The system of any of Clauses 1-8, further comprising a side return air grill secured to one or both of a sidewall or a floor of the internal space, wherein the return air grill is fluidly coupled to the side return air grill.

Clause 10. The system of any of Clauses 1-9, wherein the return air grill is secured to a floor of the internal space.

Clause 11. The system of any of Clauses 1-10, wherein the return air grill is secured to a portion of the seat.

Clause 12. The system of any of Clauses 1-11, further comprising one or more additional distribution nozzles within the internal space.

Clause 13. The system of any of Clauses 1-12, further comprising a plenum mounted to a floor of the internal space, wherein the plenum includes a filter and a fan.

Clause 14. A method comprising:
associating one or more distribution nozzles with a seat within an internal space;
associating a return air grill with the seat; and
directing airflow from the one or more distribution nozzles toward and into the return air grill.

Clause 15. The method of Clause 14, wherein said associating the one or more distribution nozzles comprises disposing the one or more distribution nozzles above the seat, and wherein said associating the return air grill comprises disposing the return air grill below at least a portion of the seat.

Clause 16. The method of Clause 15, wherein the at least a portion of the seat comprises a cushion on which a passenger sits.

Clause 17. The method of any of Clauses 14-16, further comprising providing, by an air distribution sub-system, clean air to the one or more distribution nozzles.

Clause 18. The method of any of Clause 14-17, further comprising fluidly coupling one or more outflow valves to the return air grill.

Clause 19. The method of any of Clauses 14-18, further comprising fluidly coupling an air filtration sub-system to the return air grill.

Clause 20. The method of any of Clauses 14-19, further comprising:
securing a side return air grill to one or both of a sidewall or a floor of the internal space; and
fluidly coupling the return air grill to the side return air grill.

Clause 21. The method of any of Clauses 14-20, further comprising securing the return air grill to a floor of the internal space.

Clause 22. The method of any of Clauses 14-21, further comprising securing the return air grill to a portion of the seat.

Clause 23. The method of any of Clauses 14-22, further comprising providing one or more additional distribution nozzles within the internal space.

Clause 24. The method of any of Clauses 14-23, further comprising mounting a plenum having a filter and a fan to a floor of the internal space.

Clause 25. A vehicle comprising:
an internal cabin;
a plurality of seats within the internal cabin; and
a ventilation system comprising one or more distribution nozzles and a return air grill associated with each of the plurality of seats, wherein airflow is directed from the one or more distribution nozzles toward and into the return air grill.

While various spatial and directional terms, such as top, bottom, lower, mid, lateral, horizontal, vertical, front and the like can be used to describe embodiments of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "containing" are used as the plain-English equivalents of the term "comprising" and the term "in which" is used as the plain-English equivalents of the term "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
    one or more distribution nozzles associated with a seat within an internal space;
    a return air grill associated with the seat, wherein the return air grill is attached to seat track fittings of the seat, wherein the seat track fittings secure the seat to the floor within the internal space;
    a side return air plenum secured to one or both of a sidewall or a floor of the internal space; and
    an air conduit fluidly coupling the return air grill to the side return air plenum,
    wherein airflow is directed from the one or more distribution nozzles toward and into the return air grill.

2. The system of claim 1, wherein the one or more distribution nozzles are above the seat, and wherein the return air grill is below at least a portion of the seat.

3. The system of claim 2, wherein the at least a portion of the seat comprises a cushion on which a passenger sits.

4. The system of claim 1, wherein the one or more distribution nozzles comprise at least five distribution nozzles.

5. The system of claim 1, further comprising an air distribution sub-system that provides clean air to the one or more distribution nozzles.

6. The system of claim 1, further comprising one or more outflow valves fluidly coupled to the return air grill.

7. The system of claim 1, further comprising an air filtration sub-system fluidly coupled to the return air grill.

8. The system of claim 1, wherein the one or more distribution nozzles are part of a passenger service unit within an internal cabin of a vehicle.

9. The system of claim 1, wherein the return air grill is secured to a floor of the internal space.

10. The system of claim 1, wherein the return air grill is secured to a portion of the seat.

11. The system of claim 1, further comprising one or more additional distribution nozzles within the internal space.

12. The system of claim 1, further comprising a plenum mounted to a floor of the internal space, wherein the plenum includes a filter and a fan.

13. A method for a system including one or more distribution nozzles associated with a seat within an internal space, a return air grill associated with the seat, wherein the return air grill is attached to seat track fittings of the seat, wherein the seat track fittings secure the seat to the floor within the internal space, a side return air plenum grill secured to one or both of a sidewall or a floor of the internal space, and an air conduit fluidly coupling the return air grill to the side return air plenum, the method comprising:
    associating the one or more distribution nozzles with the seat within the internal space;
    associating the return air grill with the seat;
    securing the side return air plenum to one or both of the sidewall or the floor of the internal space;
    fluidly coupling, by the air conduit, the return air grill to the side return air plenum; and
    directing airflow from the one or more distribution nozzles toward and into the return air grill.

14. The method of claim 13, wherein said associating the one or more distribution nozzles comprises disposing the one or more distribution nozzles above the seat, and wherein said associating the return air grill comprises disposing the return air grill below at least a portion of the seat.

15. The method of claim 13, further comprising fluidly coupling one or more outflow valves to the return air grill.

16. The method of claim 13, further comprising securing the return air grill to one or both of a floor of the internal space, or a portion of the seat.

17. The method of claim 13, further comprising mounting a plenum having a filter and a fan to a floor of the internal space.

18. A vehicle comprising:
    an internal cabin;
    a plurality of seats within the internal cabin; and
    a ventilation system comprising:
        one or more distribution nozzles;
        a return air grill associated with each of the plurality of seats, wherein the return air grill is attached to seat track fittings of one or more of the plurality of seats, wherein the seat track fittings secure the plurality of seats to the floor;
        a side return air plenum secured to one or both of a sidewall or a floor of the internal cabin; and
        an air conduit fluidly coupling the return air grill to the side return air plenum,
        wherein airflow is directed from the one or more distribution nozzles toward and into the return air grill.

19. The system of claim 8, wherein the one or more distribution nozzles are coupled to one or more gasper boost fans within a plenum of the passenger service unit.

* * * * *